(12) United States Patent
Winking et al.

(10) Patent No.: US 12,535,311 B2
(45) Date of Patent: Jan. 27, 2026

(54) THz SENSOR AND THz METHOD FOR MEASURING AN OBJECT TO BE MEASURED (71) Applicant: CiTEX Holding GmbH, Melle (DE)

(72) Inventors: David Winking, Georgsmarienhütte (DE); Juliane Eggert, Osnabrück (DE); Roland Böhm, Altenberge (DE)

(73) Assignee: CiTEX Holding GmbH, Melle (DE)

( * ) Notice: Subject to any disclaimer, the term of this patent is extended or adjusted under 35 U.S.C. 154(b) by 206 days.

(21) Appl. No.: 18/039,072

(22) PCT Filed: Dec. 2, 2021

(86) PCT No.: PCT/DE2021/100962
§ 371 (c)(1),
(2) Date: May 26, 2023

(87) PCT Pub. No.: WO2022/117156
PCT Pub. Date: Jun. 9, 2022

(65) Prior Publication Data
US 2024/0003676 A1 Jan. 4, 2024

(30) Foreign Application Priority Data
Dec. 4, 2020 (DE) .......................... 102020132330.1

(51) Int. Cl.
*G01B 11/06* (2006.01)
*G01B 9/02017* (2022.01)
(52) U.S. Cl.
CPC .......... *G01B 11/06* (2013.01); *G01B 9/02017* (2013.01)
(58) Field of Classification Search
CPC . G01B 11/06; G01B 11/0641; G01B 11/0658; G01B 11/08; G01B 11/14; G01B 9/02017; G01B 9/02018
See application file for complete search history.

(56) References Cited

U.S. PATENT DOCUMENTS

2023/0093966 A1* 3/2023 Klose ................. G01N 21/3581
250/341.8

FOREIGN PATENT DOCUMENTS

DE 102015122205 6/2017
DE 102016120665 4/2018
(Continued)

OTHER PUBLICATIONS

International Search Report and Written Opinion for PCT/DE2021/100962 dated Sep. 6, 2022.
(Continued)

*Primary Examiner* — Kevin K Pyo
(74) *Attorney, Agent, or Firm* — Barnes & Thornburg LLP (57) ABSTRACT

The invention relates to a THz sensor (2) for measuring an object to be measured (6), in particular, a pipe, the THz sensor (2) comprising:
  a THz transceiver (10) for emitting and receiving THz radiation,
  a lens (14) for bundling the THz radiation emitted by the THz transceiver (10) and emitting a THz transmission beam (8) along the optical axis (A) and for receiving a THz reflection beam (15),
  a support device (11), on which the lens (14) and/or the THz transceiver (10) is accommodated or fastened.
Hereby, it is provided that
  a THz radiation-influencing compensation formation for modifying and/or reducing incident THz radiation is provided in a compensation area between the lens and the support device (11).

19 Claims, 7 Drawing Sheets

(56) References Cited

FOREIGN PATENT DOCUMENTS

| | | |
|---|---|---|
| DE | 102017125555 | 5/2019 |
| JP | 2002223017 | 8/2002 |
| JP | 2008283552 | 11/2008 |
| JP | 2013149846 | 8/2013 |
| JP | 2015188174 | 10/2015 |
| WO | 2022057980 | 3/2022 |

OTHER PUBLICATIONS

German Office Action for DE 10 2020 132 330.1.
Qu Shi-Wei et al. "Terahertz Reflecting and Transmitting Metasurfaces," Proceedings of the IEEE, IEEE. New York, US, vol. 105. No. 6. Jun. 1, 2017 (Jun. 1, 2017). pp. 1166-1184.
Wu Geng Bo et al. "High-Gain Circularly Polarized Lens Antenna for Terahertz Applications," IEEE Antennas and Wireless Propagation Letters, IEEE, Piscataway, NJ, US, vol. 18, No. 5, May 1, 2019 (May 1, 2019), pp. 921-925.
Khorshidi Mohammadreza et al. "Dielectric Structure with Periodic Strips for Increasing Radiation Power of Photoconductive Antennas: Theoretical Analysis," Journal of Infrared, Millimeter and Terahertz Waves, Springer New York LLC, US, vol. 38, No. 5, Jan. 26, 2017 (Jan. 26, 2017), pp. 609-629.

* cited by examiner

THz SENSOR AND THz METHOD FOR MEASURING AN OBJECT TO BE MEASURED

CROSS REFERENCE TO RELATED APPLICATIONS

This application is a U.S. national stage application under 35 U.S.C. § 371 (b) of International Application No. PCT/DE2021/100962 filed Dec. 2, 2021, which claims priority to the German Patent Application No. 102020132330.1 filed on Dec. 4, 2020, the disclosures of both of which are hereby expressly incorporated by reference in their entirety.

The invention relates to a THz sensor and a THz measuring method for measuring an object to be measured. Further, a measuring device is provided. The measurement may service, in particular, to determine distances and/or layer thicknesses of the object to be measured. The object to be measured may be, in particular, a pipe made of plastics, rubber or another material permeable for THz radiation.

THz sensors for layer thickness measurements and distance measurements generate a THz transmission beam which is emitted along an optical axis towards the object to be measured. Hereby, the THz sensor generally comprises a support device, a THz transceiver and a lens for bundling the THz radiation. Hereby, the THz transceiver comprises an emitter and a receiver which may, in particular, be combined; however, emitter and receiver may be provided as separate units so that the transceiver is then formed by spatially separate embodiments of emitter and receiver.

Advantageously, THz sensors further comprise a waveguide, guiding the THz radiation emitted by the THz transceiver towards the lens. The lens is formed (e.g., from a plastic or even silicon) and shaped (e.g., as an oval) at its front surface, i.e., in the direction facing the object to be measured, and generally having a planar rear surface. The THz radiation emitted is through the lens is focused and along the optical Axis output as a THz transmission beam. The THz transmission beam passes through boundary surfaces of the object to be measured, on each of which a part of the THz transmission beam is reflected back due to the transition of the media with different refractive index. Thus, a THz reflection beam travels along the optical axis back to the lens, through the lens to the waveguide and to the THz transceiver, and generates a usable reflection peak for each boundary surface which, therefore, represents the point in time of the reflection.

It is apparent that in such THz measurements multiple reflections may occur, where, in particular, the reflected beam is reflected by the THz sensor back to the object to be measured so that at the boundary surfaces of the object reflections will be created anew and travel back to the THz sensor. In the measuring signal such multiple reflections occur, due to the longer time of flight, as further measuring peaks compromising the measuring signal. Furthermore, disturbing reflections may occur at the lens or the lens surfaces respectively, e.g., reflected from the lens surface back to the waveguide.

The document JP 2013-149846A describes a THz wave generating element which may be adapted to maintain the strength of a radiation when using a conventional antenna and a substrate. Hereby, an excitation by multi-photon absorption is created, whereby the absorption of the THz wave can be reduced by the substrate.

The citation DE 10 2016 120 665 B3 describes a radar sensor unit to be utilized in enclosed environments, in particular, in oil-filled hydraulic cylinders, including a radar electronic device comprising at least one high-frequency antenna for emitting and receiving von high-frequency radiation. Further, a lens for bundling the high-frequency radiation and a metal support with a gap for mounting the radar electronic device are provided. The radar sensor unit preferably operates in the GHz or THz band. The radar electronic device is enclosed by a robust housing which is essentially formed solely by the lens and the support.

The document JP 2002-223017A describes a THz device and a device for generating THz light as well as a device for detecting the THz radiation, wherein the loss of THz radiation is to be reduced.

The citation JP 2015-188174A describes an MMIC-integrated module, in which, to improve the radiation efficiency of a radio wave, a metal reflection plate is formed on an underground of a small cavity opposite an antenna of an MMIC chip.

The document DE 10 2015 122 205 A1 describes a THz measuring device for measuring a layer thickness and/or a distance, wherein a plurality of measurements are carried out in different optical axes and the optical axis of the emitted THz radiation is adjusted during the measurement or in-between measurements, where one or more measurements are used to determine a layer thickness.

The citation WO2021123111A1 describes a waveguide arrangement for guiding electromagnetic waves in a hollow space surrounded by a conducting material, the waveguide arrangement comprising a circuit board material comprising a electrically conductive, plate-shaped back side, a substrate, and a conductive layer arranged on the side of the substrate facing away from the back side. The invention provides for the back side to comprise a surface structure, preferably formed by at least one gap, directly limiting, at least in part, the wave guiding hollow space; and/or that the hollow space is formed in split block technology by connecting the circuit board material as split block base with a corresponding cover as split block top.

It is the object of the invention to create a THz sensor as well as a THz measuring method allowing for accurate THz measurements.

This task is solved by a THz sensor and a THz measuring method according to the independent claims. The sub-claims describe preferred further developments. Hereby, further, a THz measuring device including the THz sensor is provided. The THz measuring method according to the invention may be carried out, in particular, using the THz sensor according to the invention and/or the THz measuring device according to the invention.

Moreover, advantageously, an arrangement consisting of the THz measuring device and the object to be measured is provided, in particular, an arrangement in which the object to be measured is received in a measuring space of the THz measuring device.

Accordingly, the THz radiation is influenced by means of a compensation formation in a compensation area between the lens and the support device. Owing to this influence a reflection of the reflected beam on the THz sensor can be modified such that the multiple reflection peaks are at least reduced if not prevented.

According to the invention, it is recognized that an influence in this area may be sufficient to reduce multiple reflections in the wanted signal.

Advantageously, the THz sensor includes a waveguide which guides the THz radiation between the THz transceiver and the lens. Hereby, advantageously, a central detection area in front of and next to the waveguide formed around the optical axis is not influenced by the compensation formation. This is based on the finding that the reflections at the sensor, which lead to the disturbing multiple reflections, in particular, occur outside the central detection area and, thereby, it is possible to limit the compensation accordingly without disturbing the measuring signal in the central detection area.

The compensation formation may be formed, in particular, in a connecting area, e.g. a ring-shaped connecting area, existing directly around the detection area or, respectively, bordering the detection area, because this provides the largest contribution to the multiple reflections.

Preferably, the compensation area may be provided at the lens, in particular, the rear part of the lens, and/or at the support device, in particular, a front face of the support plate serving as support device, and/or in the gap between the lens and the support device. Thus, suitable spots may be chosen depending on the type of compensation.

According to the invention, several options of influencing are provided, each alone or in combination with others:

a) Emitting and detecting THz radiation polarized in a polarization direction, where the polarization is influenced, in particular, rotated, preferably about 90°. Thus, since the polarization of the reflected radiation in the central detection area remains unchanged, this can be picked up; in contrast hereto, the interference radiation or, respectively, the radiation incident outside the central detection area is rotated so that it, after being reflected anew, will arrive at the object to be measured or even at the lens surface with a rotated polarization and, therefore, will not be detected.

Advantageously, the waveguide emits polarized THz radiation. The waveguide may be suitably adapted for this, or an additional polarization filter will be used.

Hereby, according to one embodiment, the rotation may be created by a transpolarization (transverse polarization) structure which extends in the lateral plane, i.e., perpendicular to the optical axis, under a transpolarization angle, in particular, 45°, in relation to the polarization direction (Y).

The transpolarization structure may be made using little expenditure, at small cost and with high accuracy. Moreover, it lies in a mechanically protected are and, therefore, is not subject to direct wear and tear.

When rotating about, e.g., 90°, where no component remains in the proper plane, only the doubly re-reflected radiation, i.e., a triple reflection peak, can be picked up again; however, this only makes a small contribution.

The transpolarization structure may exhibit, in particular, one or more of the following characteristics:

profiles extending in the direction of the structure, e.g., elevations in the structure and recesses formed between the structure elevations, such as a rectangular profiling, a structure width that is smaller than a relevant wavelength of the THz radiation lies, e.g., in a range between one tenth and one half of the relevant wavelength, a structure height, which is, for example, one quarter of the relevant wavelength plus a multiple integer of one half of the relevant wavelength, e.g., equal to one quarter of the relevant wavelength, where $h16=\lambda/4+n*\lambda/2$, with $\lambda$ as the relevant wavelength, h16 as the structure height, e.g., structure height, n as integer or, respectively multiple including zero, $$e.g., h16 = 0*\frac{\lambda}{2}+\frac{\lambda}{4}, 1*\frac{\lambda}{2}+\frac{\lambda}{4}, 2*\frac{\lambda}{2}+\frac{\lambda}{4} ...$$

Hereby the relevant wavelength may be, in particular, the shortest wavelength or an average wavelength of the emitted THz radiation.

According to the invention, advantageously, the relevant wavelength may be selected individually adapted to the various structures. Thus, it is possible, in particular, to select, for the dimensions of the structure width, the shortest wavelength of the emitted THz radiation as the relevant wavelength, and/or to select, for the dimensions of the structure height, an average wavelength of the emitted THz radiation as the relevant wavelength.

b) attenuating the THz radiation, in particular, the incident reflected radiation and/or the radiation reflected back from the sensor, in the compensation area. To that end, an attenuating medium may be provided in the compensation area which, therefore, does not adversely affect the central detection area. Thus, the compensation area, through which the multiple reflection radiation passes at least twice, can provide an effective attenuation. The attenuation element may be received between the lens and the support device and can thus be fastened with little effort. It can be securely covered or, respectively, protected from further influence and pollution.

The attenuating medium attenuates the THz radiation, in particular, in a relevant wavelength band, e.g., a wavelength band around an average wavelength. Advantageously, the attenuating medium has a refractive index corresponding to the refractive index of the lens, in particular, at the transition to the lens, so that no further reflection occurs between the rear side of the lens and the attenuating medium but, in particular, a reflection only between the attenuating medium and the metal of the reflection plane or, respectively the front side of the support plate. Hereby, the attenuating medium may have a refractive index which is uniform and corresponds to the refractive index of the lens, or corresponds to the refractive index of the lens only at the transition and subsequently changes progressively.

c) Deflecting or reflecting the THz radiation, at least in part, in direction perpendicular to the optical axis, in particular, in an outward direction. To that end, a taper is provided at the front face of the support device, in particular, in the central connecting area around the detection area. It is apparent that such a taper of the front side alone is capable of sufficiently outwards deflecting the reflected radiation essentially running along or, respectively, parallel to the optical axis so that it will not be guided forward through the lens towards the object to be measured where it will again be reflected and subsequently detected. Hereby, test have shown that, in particular, the central connecting area around the detection area is responsible for a large part of the doubly reflected radiation, and, therefore, the taper in this connecting area is particularly advantageous.

d) Forming a destructive interference, in particular, by reflecting the THz radiation in offset reflection surfaces of an interference structure. It is recognized that a suitable shaping or structuring respectively of the rear side of the lens leads to a compensation by destructive interference, e.g., by means of profiling with height differences depending on a relevant wavelength. Hereby, in particular, even a destructive interference of more than just one relevant wavelength may be provided, e.g., several wavelengths in the wavelength band of the emitted THz radiation.

The structuring can be formed with little effort, at low cost, without any additional requirements in material, in a protected area, and, in particular, with high accuracy, because the THz radiation allows for precise structuring in the millimeter or centimeter range.

The destructive interference of the re-reflected reflection beam may happen, in particular, by means of an interference structure with a structuring depending on a relevant wavelength, e.g., one quarter of the average wavelength.

e) Forming a destructive interference, in particular, by applying one or more layers of at least one material having another refractive index, i.e., higher or lower, than the material of the lens, with destructive interference of the reflected beam at the transition of the lens surface to the layer, and the reflected beam at the transition of the layer to the adjacent medium, which may be, in particular, an air gap, a metal layer or another material. Thus, hereby, four different cases may be distinguishes, depending on the ratio of the mediums at the transitions or boundary layers respectively.

Hereby, the medium may be chosen as air or even as metal coating. However, advantageously, this embodiment may also be combined with the attenuation embodiment.

According to the invention, it is also apparent, in particular, that these various embodiments can be suitably combined with one another, so as to complement each other without adversely affecting each other. Thus, the taper allows to leave a gap open into which the attenuating medium can then be introduced as an addendum. The transpolarization structure, too, may be suitably combined with the attenuating medium without requiring any change of the distance of the support device or support plate respectively, to the lens. Thus, the support plate can still accommodate the lens securely and firmly.

According to an advantageous further development, the waveguide may be formed by two waveguide channels which, owing to their elongates shape, e.g., rectangular shape, each support only a linear polarization. Hereby, the waveguide channels are preferably followed by coupling-in points together forming the compensation area or respectively part of the compensation area. Thereby, a coupling-in into directions orthogonal in relation to one another is achieved.

According to an advantageous further development, an OMT, i.e., Orthomode transducer, or Orthomode coupler respectively may be provided which splits up circular polarized waves or, respectively, joins orthogonal polarized waves. Thereby, a compact and technically secure splitting is achieved.

The THz frequency may be, in particular, in a range between 10 GHz and 10 THz, e.g., between 50 GHz and 4 THz or 50 GHz and 1 THz, and occur using direct time-of-flight measurement, or pulsed radiation. Thus, advantageously, the THz radiation can include even radar radiation and/or microwave radiation.

For the embodiment with polarized light, in particular, a frequency modulation is advantageous, in particular, as a FMCW radar (frequency modulated continuous radar radiation).

The invention is illustrated in the following using accompanying drawings by means of a few embodiments. It is shown in.

Figure 1:
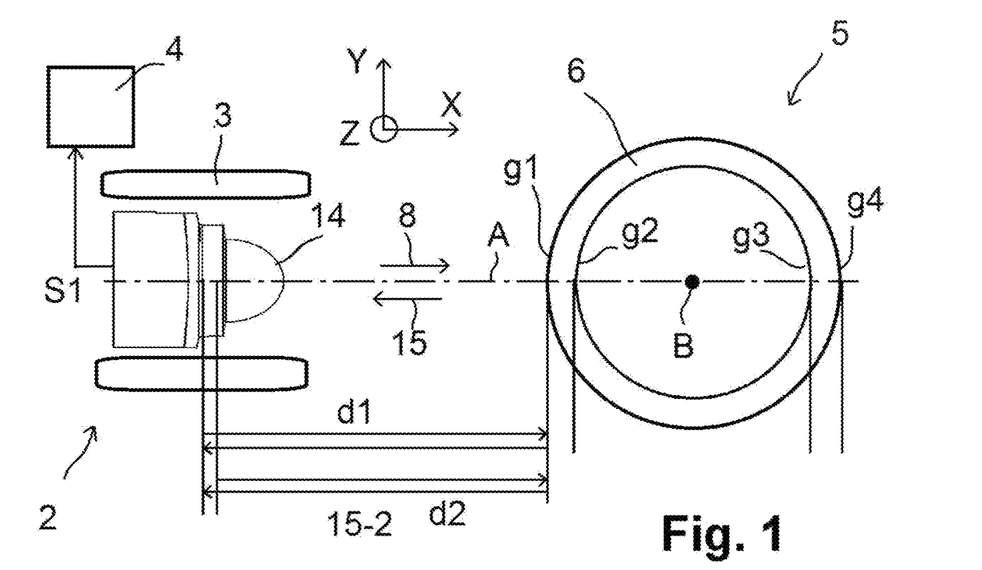
FIG. 1 a THz measuring device for measuring a pipe as object to be measured.

A THz measuring device 1 comprises, inter alia, a THz sensor 2 with an adjustment device 3 and a controller device 4 as well as a measuring space 5 and serves to measure an object to be measured 6, e.g., a pipe made of plastics, rubber, and/or paper, where the pipe 6 is transported along its pipe axis, i.e., the axis of symmetry B of the measuring space 5. Besides a pipe, a round pipe, a rectangular pipe, a profile, a window profile, a gutter, a rain gutter, and other geometries may be covered. The THz measuring allows layer thicknesses and distances, as well as even the refractive index 86 of the material to be measured, in particular, after extrusion of the pipe 6, so as to determine-faults and deformation. The THz sensor 2 may be guided circumferentially around the measuring space 5 or the axis of symmetry B respectively, so as to measure the entire circumference of the pipe 6. Furthermore, a plurality of THz sensors 2 may be arranged circumferentially around the measuring space 5, e.g., even with joint rotational adjustment.

Figure 2:
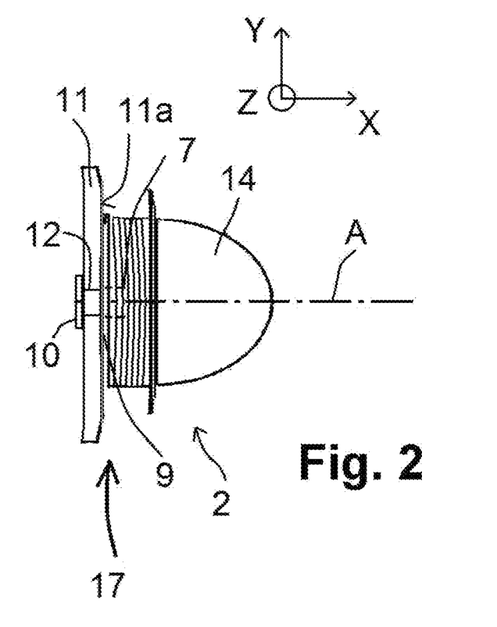
FIG. 2 the construction of a THz sensor in a lateral view.

The THz sensor 2 emits a THz transmission beam 8 along it optical axis A into the measuring space 5 and onto the object to be measured 6. Hereby, the THz sensor 2 comprises a THz transceiver 10, e.g., a sensor chip, which is mounted on a support plate 11, a waveguide 12 arranged in front of or, respectively on the THz transceiver 10, and a lens 14. The lens may be made of plastics or silicon. The THz radiation emitted by the THz transceiver 10 is first guided via the waveguide 12 and then passes through the lens 14, which concentrates the THz radiation thereby forming the THz transmission beam 8, whereby it may be provided, in particular, to focus the THz transmission beam 8, e.g., onto the axis of symmetry B and/or the object to be measured 6. The focusing may be made via the adjustment device 3.

The THz transmission beam 8 travels from the THz sensor 2 along the optical axis A through the object to be measured 6, whereby partial reflection occurs on boundary surfaces g1, g2, g3, g4 of materials with different refractive indexes ε so that a THz reflection beam 15 is reflected along the optical axis A back to the THz sensor 2. Thus, in the case of the single-layer pipe 6 shown here, reflections occur on the front outer surface g1 between air and the pipe 6, subsequently on the boundary surface g2 upon exiting the pipe 6 in its interior space, and, accordingly, subsequent reflections on boundary surfaces g3, g4 upon entry into the pipe 6 and upon subsequent exit. In addition, a mirror for sensing a total reflection may be provided behind the pipe 6. Thus, the boundary surfaces g1, g2, g3, g4 generate partial reflections in the reflected beam 15. Thus, the THz sensor 2 emits a proper measuring signal S1 with one wanted peak P0 each corresponding to the respective partial reflection on each boundary surface g1, g2, g, g4, from which, therefore, layer thicknesses and distances as well as material characteristic such as the refractive index 86 can be determined by the controller device 4 as time-of-flight measurement. Hereby, the refractive index 86 can be determined as the ratio of the speed of light c0 in a vacuum (or air respectively) to the speed of light c6 in the material of the pipe 6, i.e., ε6=c0/c6).

The THz radiation for forming the THz transmission beam 2 may lie, in particular, in a frequency range between 10 GHz and 10 THz, e.g., between 50 GHz and 5 THz. Thus, it may lie in the Gigahertz and Terahertz band, in particular, including the radar band and microwave band in total or in part. Hereby, the THz transmission beam 2 may be made as direct time-of-flight measurement, but also as frequency modulation, as well as with pulsed radiation.

In a XYZ coordinate system the X direction extends along the optical axis A, accordingly, the YZ plane perpendicular or, respectively, lateral thereto.

The lens 14 is designed essentially drop-shaped or oval respectively towards the front, i.e., in the x direction facing the object to be measured 6, and with its planar rear side 14a supported on and attached to the front face 11a of the support plate 11.

Figure 3:
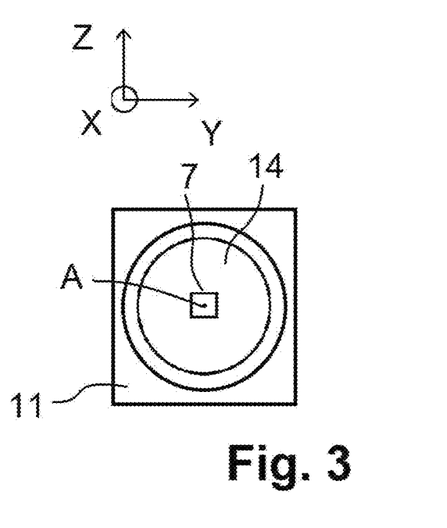
FIG. 3 a top view on the sensor support without lens.

A central detection area 7 extends in the lateral YZ plane around the optical axis A and around the waveguide 12 or, respectively, in the X direction forwards around the optical axis A. Thus, the reflected beam 15 which impinges in this central detection area 7 is received by the waveguide 12 and detected by the THz transceiver 10.

Figure 4:
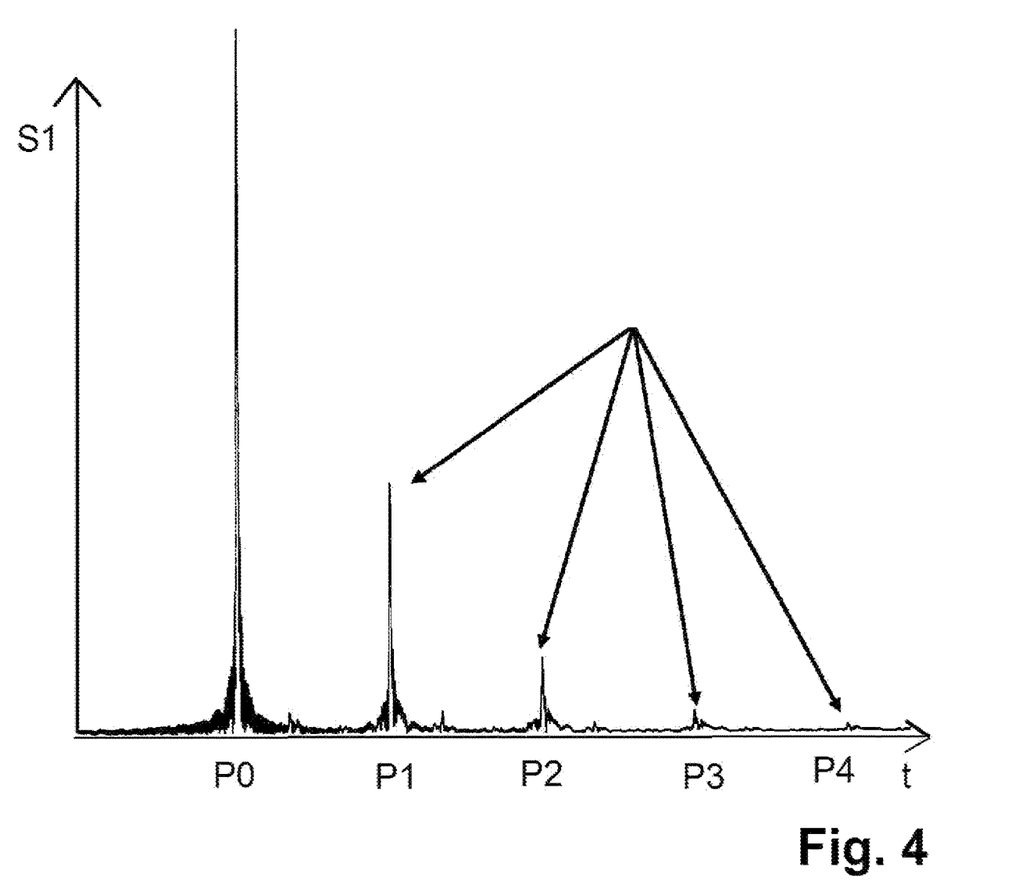
FIG. 4 a diagram of a measuring signal with multiple reflections.

FIG. 4 shows a time diagram of a measuring signal S1 with a wanted signal peak P0 which is generated by proper reflection of the THz transmission beam 8 on a boundary surface, e.g., g1. As a matter of principle, in addition to the wanted signal peak P0, unwanted multiple reflections will occur which may lead to multiple reflection peaks P1, P2, P3, . . . , as shown in FIG. 4. The reflected beam 15 emitted from the THz sensor 2 along the optical axis A onto the object to be measured 6 and reflected on the boundary surfaces g1, g2, g3 and g4 again passes through the lens 14, whereby the part of the reflected beam 15 coming in centrally in the travels into the waveguide 12 and to the THz transceiver 10 and generates the wanted reflection peak P0. Thus, according to FIG. 4, the wanted reflection peak P0 will appear in the measuring signal S1 with a time of flight that corresponds to the distance d1 of the boundary surface g1 in relation to the THz transceiver 10. Hereby, distances are determined as double the path length of the THz radiation from the sensor 2 to the boundary surface g1 and back to the sensor 2.

A part of the reflected beam 15 travels in the lateral YZ plane outside the detection area 7 against, e.g., the front face 11a of the support plate 11, is reflected again here, thereby travelling again in the X direction forwards through the lens 14, essentially along the optical axis A towards the object to be measured 6 so that it is partially reflected anew on the boundary surfaces g1, g2, g3 and g4 and travels back to the sensor 2 as double reflected beam 15-2 and is received by the THz transceiver 10. Thus, an additional measuring peak P1 will appear later in time owing to the double reflection on the first boundary surface g1 which, when properly evaluated, corresponds to the measuring peak wanted reflection peak respectively at a distance which, owing to the longer path or time of flight respectively in addition to the distance d1, corresponds to the distance d2 from the front face 11a to the boundary surface g1. Thus, a perceived boundary surface at a distance d1+d2 can be detected.

Thus, in FIG. 4, owing to the multiple reflection peaks P1, P2, P3 . . . may occur which lie in areas in which proper measuring peaks are to be expected also because, for example, the front wall area with the boundary surfaces g1, g2 lies temporally before the rear wall area with the boundary surfaces g3, g4 so that the double reflection peak of g1 may get into the time range of g3 or g4. Thus, the superimposition may compromise the evaluation.

According to the invention, a compensation formation 17 is provided which is shown in various embodiments. It serves to compensate, in particular, to avoid or reduce the multiple reflection peaks, in particular, the double reflection peaks P1. The compensation formation 17 is provided, in particular, in a compensation area 9 formed between the lens 14 and the support plate 11.

The compensation area 9
extends in the YZ plane, in particular, outside the central detection area 7, to avoid any influence of the directly received measuring signal of the proper single reflection, i.e., with the wanted reflection peak P0,
whereby it may encompass in the X direction the rear side 14a of the lens 14, the front face 11a of the support plate 11, and a gap potentially created in-between these.

Figure 5:
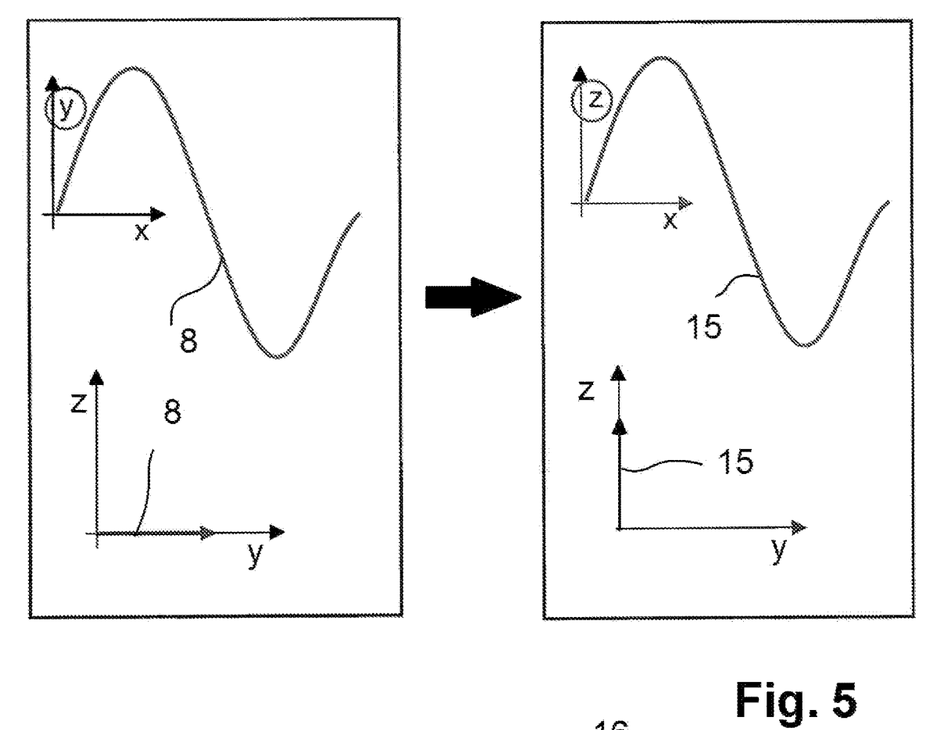
FIG. 5 an embodiment with transpolarization.
Figure 6:
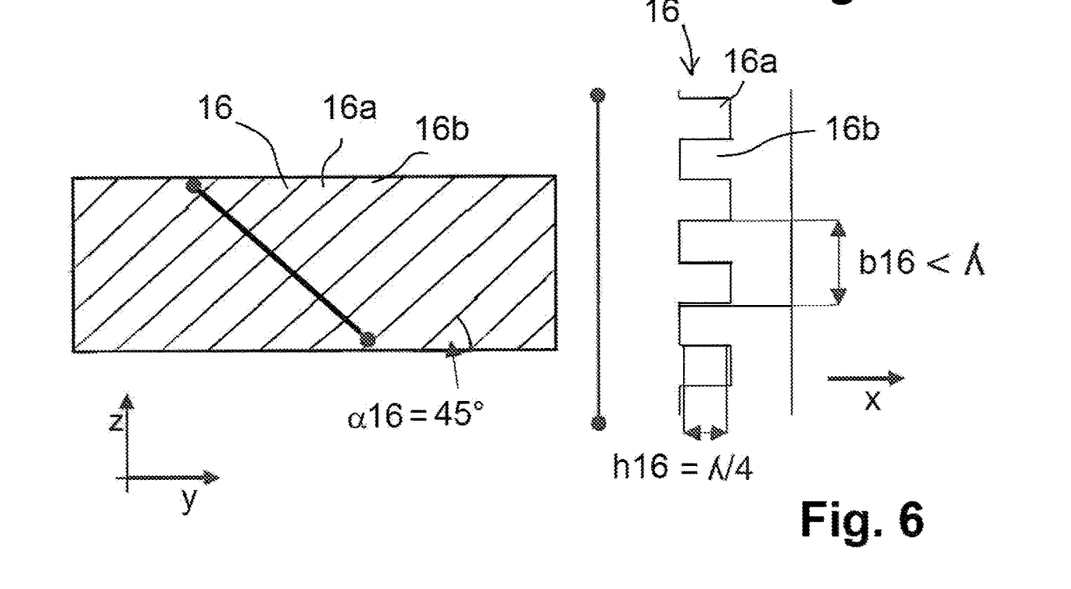
FIG. 6 the embodiment of the sensor with transpolarizing structure.

FIGS. 5, 6 show an embodiment with transpolarization (transverse polarization). Hereby, the THz sensor 2 emits a polarized THz transmission beam 8 which oscillates, for example, in the xy plane. In the compensation area 9 a transpolarization structure 16 is formed, as shown in FIG. 6, which rotates the polarization plane of incident THz radiation about 90°. Thus, in the second reflection of the reflected beam 15 the polarization is rotated about 90° so that the reflected beam exhibits a polarization rotated by 90° compared to the transmitted beam 8 and oscillates, for example, in the xz plane. The doubly reflected beam will be reflected again accordingly on the boundary surfaces g1, g2, g3, g4 and travels as doubly reflected beam 15-2 through the lens 14 back to the waveguide 12. However, because only the emitted polarization direction of the THz transmission beam 8 is able to couple-in again into the waveguide 12 and to the THz transceiver 10, the doubly reflected beam 15-2 will no longer be measured. In principle, the THz beam reflected again on the reflection plane, e.g., the font face 11a, which, therefore, again oscillates in the XY plane following double rotation of the polarization, may subsequently, after reflection on the boundary surfaces g1 through g4, again lead to a measuring peak; however, for one thing, this will be significantly smaller and, for another, can be subsequently recognized und subtracted. In particular, according to the above embodiments, the double reflections are problematic because, in particular, the double reflections on the front boundary surfaces g1, g2 may lie in the area of the proper measuring signals of the rear boundary surfaces g3, g4 making them more difficult to recognize and subtract.

FIG. 6 shows an advantageous embodiment of the transpolarization structure 16, where on the reflection plane, in particular, the front face 11a, a profiling is formed, in particular, as a formation of structure elevations, i.e., in particular, profiles 16a, and structure recesses 16b, i.e., slots or grooves. The transpolarization structure 16 may be designed, in particular, as a rectangular structure, i.e., with vertical walls between the profiles 16a and the slots 16b, where the transpolarization structure 16 preferably exhibits a structure width b16, i.e., the width of one unit made of profile 16a and slot 16b, which may be smaller than the wavelength λ or the average wavelength λ.

Thus, the structure width b16 may lie in a range between $\frac{1}{10}\lambda$ and $\frac{1}{5}\lambda$. The profile height h16 may lie in a range of a quarter of $\lambda$ or $\frac{1}{4}\lambda$ respectively.

The transpolarization structure 16 runs at a structure angle $\alpha 16$ of 45° in relation to the Y direction and the Z direction in reflection plane as YZ plane, in particular, the front face 11a.

Figure 7:
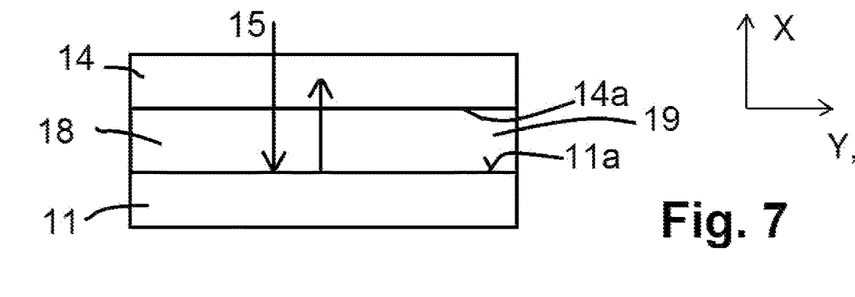
FIG. 7 an embodiment with attenuation of the reflections.

FIG. 7 shows an embodiment with attenuation of the reflected beam 15 by means of an attenuating medium 18 which is introduced in a gap 19 between the lens rear side 14a and the front face 11a of the support plate 11, leaves the central detection area 7 open and attenuates the THz radiation in the relevant frequency range. Such an attenuating medium 18 can be described as complex relative permittivity Er, where, $$\varepsilon_r = \varepsilon'_r + i\varepsilon''_r,$$

Where the correlation between
the complex relative permittivity Er,
the refractive index n and
the absorption coefficient k
is defined, in particular, by $$n^2 = \frac{1}{2} + \left(\sqrt{\varepsilon'r^2 + \varepsilon''r^2} + \varepsilon'r\right)$$

For small values of $\varepsilon''_r$ it can be assumed that $n^2 = \varepsilon'_r$, where, in particular, the imaginary part E"r indicates the attenuating by the attenuating medium 18.

Hereby, the complex relative permittivity is not limited to a constant value, but may change gradually within the medium so that no sharp discontinuity in permittivity exists on the boundary surface to the lens, while the attenuation may consistently increase along beam path.

By introducing the attenuating medium 18 with a high attenuation value $\varepsilon''$ the reflection between the lens rear side 14a and the metal of the support device or, respectively, the front face 11a can be suppressed or strongly reduced respectively, without compromising the wanted signal.

The difference in the value of $\varepsilon_r$ between two dielectric media indicates the strength or height respectively of the reflection caused on the respective boundary layer. Thus, it is possible to suppress the reflection by a medium or attenuating medium 18 respectively, which meets the following conditions:
  a maximum attenuating value $\varepsilon''_r$-18 of the attenuating medium 18,
  the amount of the complex relative permittivities Er of the media 18, 14 is equal at the transition of the materials, i.e.,
  $\varepsilon_r$, 18=$\varepsilon_r$, 14.

Since the central detection area 7 is kept open neither the THz transmission beam 2 nor the central part of the reflected beam 15 are attenuated.

Figure 8:
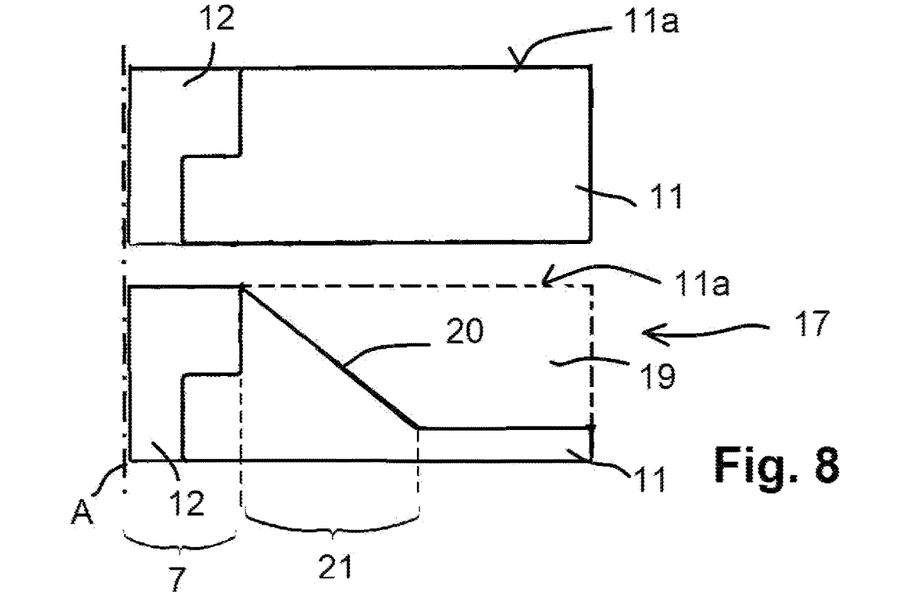
FIG. 8 an unchanged sensor and beneath it an embodiment with a taper in the reflection plane.

FIG. 8 shows in the upper part an unchanged design of the sensor 2 in the detection area 7 and the connecting area 21, and at the bottom an embodiment with a taper for lateral deflection of disturbing components of the reflected beam 15. Hereby, the support plate 11 on the support plate front face 11a is structured, in particular, sloped, such that the reflected beam 15 outside the central detection area 7 upon impingement on the front face 11a of the support plate 11 is laterally deflected somewhat, i.e., is reflected back not exactly perpendicularly along the optical axis A. Hereby, the reflection plane, i.e., the front face 11a, in particular, in a connecting area 21 in the immediate vicinity of the waveguide 12 or, respectively, of the detection area 7 formed in front of the waveguide is sloped so that a taper 20, in particular, laterally sloping to the outside, is formed around the waveguide 12. Hereby, it was measured that this central connecting area 21 around the waveguide 12 is responsible for a large portion of the double reflected radiation, and therewith, according to the invention, is significantly reduced by the taper.

The embodiments of FIGS. 5, 6, 7, 8, 9 can be advantageously combined. Thus, in particular, the attenuating medium 18 may be provided in addition to the taper 20. The attenuating medium 18 may, in particular, be introduced in the intermediate area 19 exposed by the taper 20, shown in FIG. 8 as a dotted region. This also guarantees that no attenuating medium 18 reaches the area in front of the waveguide 12.

Figure 9:
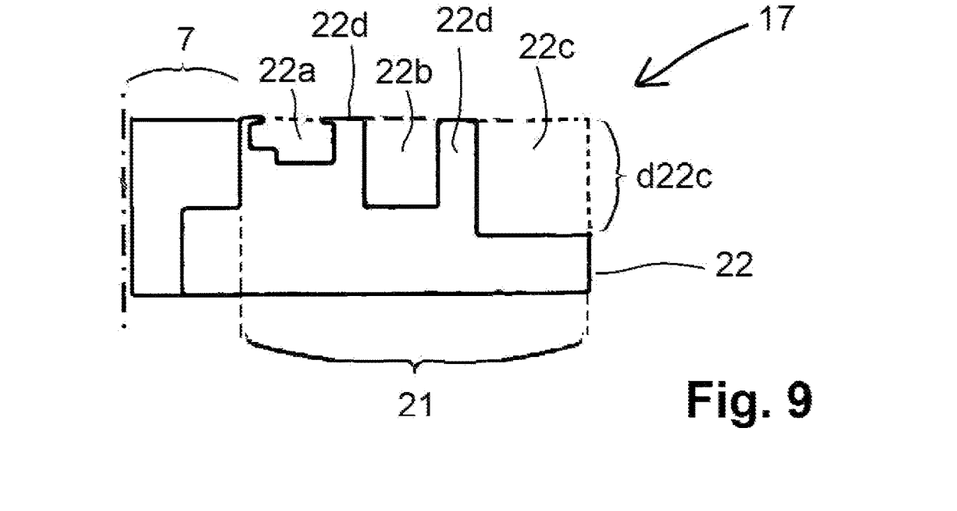
FIG. 9 an embodiment with structuring of the reflection plane for a destructive interference.
Figure 10:
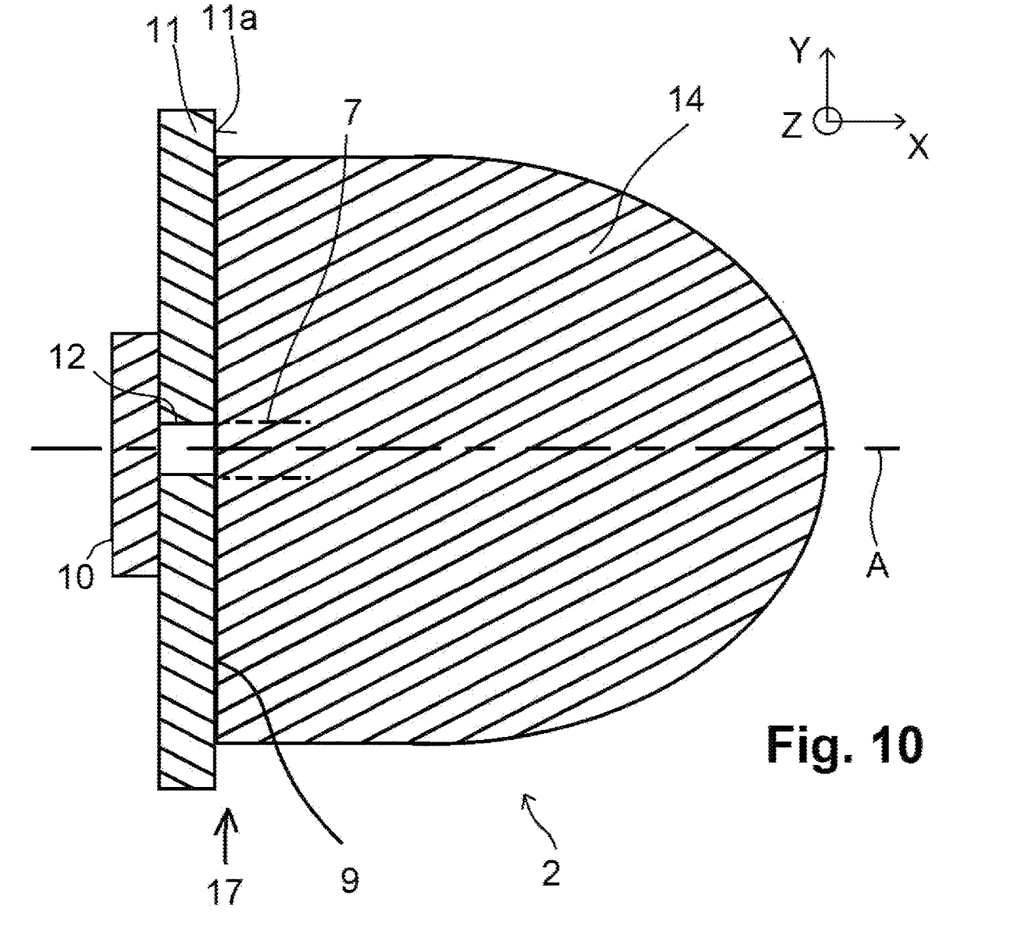
FIG. 10 the construction of a THz sensor in a sectional side view, corresponding to FIG. 2.

FIG. 9 shows a further embodiment for suppressing the multiple reflections, where in the reflection plane, i.e., in particular, the front face 11a of the support plate 11, outside the detection area 7, in particular, in the connecting area 21, an interference structuring 22 is formed, allowing for a widest possible destructive interference of the impinging and re-reflected reflected beam 15. To that end, starting from the front face 11a, structure recesses 22a, 22b, 22c with varying depths are formed so that the reflected beam 15 is reflected, for one thing, on the remaining areas 22d of the original surface 11a of the support plate 11, and, for another, in the various recesses 22a, 22b, 22c.

Hereby, the depths d, d22a, d22b, d22c, of which only the depth d22c of the recess 22c is shown in this drawing, are dimensioned such that a beam reflected in these recesses will each have a change in path length compared to the beam reflected on the surface 11a or, respectively, the remaining areas 22d between the recesses 22a, 22b, 22c that will lead overall to a destructive interference. Thus, the structure recess 22a has a depth of $\lambda/4$ so that the reflected beam 15, which travels into the recess 22a and later exits the recess 22a after being reflected, has a change in path length of $2\times\lambda/4=\lambda/2$ compared to the beam reflected on the surface 11a, respectively, the areas 22d, i.e., interferes destructively with the beam components reflected on the area 22d. The further recesses 22b, 22c may have depths of multiples of $\lambda/4$, where they, in particular, each also alternate in a lateral direction with area 22d so as to form an effective destructive interference.

Hereby, various type of interference structuring 22 are possible which meet these requirements that the beam components which are reflected in the various recesses 22a, 22b, 22c and 22d have the appropriate changes in path length, at a corresponding or equal level of energy or beam intensity respectively, so that a complete or mostly destructive interference occurs.

Figure 11:
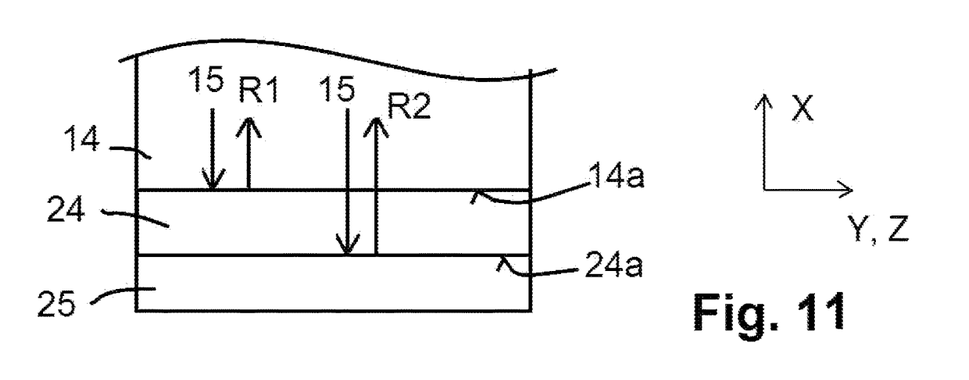
FIG. 11 embodiments with coating of the lens for a destructive interference.

FIG. 11 shows an embodiment wherein on the lens surface, in particular, the lens rear side 14a, a coating 24 is applied as a consistent layer. Thus, the representation of FIG. 11 essentially corresponds to that of FIG. 7. The coating 24 is followed by a medium 25 which, according to different embodiments, may be air or even a metal layer. Hereby, the materials of the layers 24 and 25, i.e., the refractive indexes (permittivities) n14, n24 and n25 of the materials of the media of 14, 24 and 25 as well as the thickness d24 of the layer 24, are chosen such that a destructive interference of the partial reflected beams R1 and R2 occurs on the boundary surfaces 14a of the lens 14 and 24a of the coating 24.

The reflected beam 15 coming through the lens 14 travels to the leans rear side 14a, i.e., the transition to the coating 24, where the first partial reflected beam R1 is generated,
> further, the reflected beam 15 travels through the coating 24 and to the boundary surface 24a, i.e., the transition from the coating 24 to the medium 25, where the second partial reflected beam R2 is generated.

Depending on the ratio of the refractive indexes (permittivities) n14, n24 and n25
> a phase jump of one-half lambda will occur on the boundary surfaces 14a and 24a when the reflected beam 15 travels from an optically thinner medium (smaller refractive index or smaller n respectively) to an optically thicker medium (larger refractive index n), or there will be no phase jump when the reflected beam 15 travels from an optically thicker medium (larger refractive index or larger n respectively) to an optically thinner medium (smaller refractive index or smaller n respectively)

Hereby, this embodiment is referred to, in particular, at least one relevant wavelength $\lambda$, preferably to a plurality of relevant wavelengths $\lambda$.

The partial reflected beams R1 and R2 form a destructive interference when, in particular, the following is true for the wavelength $\lambda$:

A) if n 24 is larger than n 14:
R1 exhibits a phase jump of $\lambda/2$,
> A1) if n 25 is smaller than n 24, e.g., with air as the medium 25,
> i.e., n 25=1,
> then R2 will appear without phase jump, where, in that case, preferably
> d24_=$\lambda/2$ is chosen, possibly even d24_=$\lambda/2+Z*\lambda/2$
> where Z is an integer, i.e., Z=0, 1, 2, 3
>> A2) if n 25 is larger than n 24, e.g., with metal as the medium 25, such as a metal layer, metal vaporization, or even a thicker attenuating medium 18 of the embodiment shown above in FIG. 7, then R2 will appear with a phase jump, where, in that case, preferably d24_=$\lambda/4$ is chosen, possibly even d24=$\lambda/4+Z*\lambda/2$
>> where Z is an integer, i.e., Z=0, 1, 2, 3

B) if n 24 is smaller than n 14:
R1 has no phase jump,
> B1) if n 25 is smaller than n 2, e.g., with air as the medium 25, i.e., n 25=1,
> then R2 will appear without phase jump, where, in that case, preferably d24=$\lambda/4$ is chosen, possibly even d24_=$\lambda/4+Z*\lambda/2$
> where Z is an integer, i.e., Z=0, 1, 2, 3
>> B2) if n 25 is larger than n 24, e.g., with metal as the medium 25 25, such as a metal layer, metal vaporization, or even a thicker attenuating medium 18 of the embodiment shown above in FIG. 7, so then R2 will appear with a phase jump, where, in that case, preferably d24_=$\lambda/2$ is chosen, possibly even d24_=$\lambda/2+Z*\lambda/2$
>> where Z is an integer, i.e., Z=0, 1, 2, 3

Hereby, preferably, the central detection area 7 around the optical axis A is kept open again.

The medium 25 as air may be present, in particular, in an arrangement of the lens 24 in front of the plate 11,
> the medium 25 as a thicker medium in the case of, e.g., the aforementioned metal coating but also another coating.

Hereby, the embodiment of FIG. 11 may be combined well, in particular, with the embodiment of FIG. 7, in that the medium 25 of FIG. 11 is chosen as an attenuating material 18.

Figure 12:
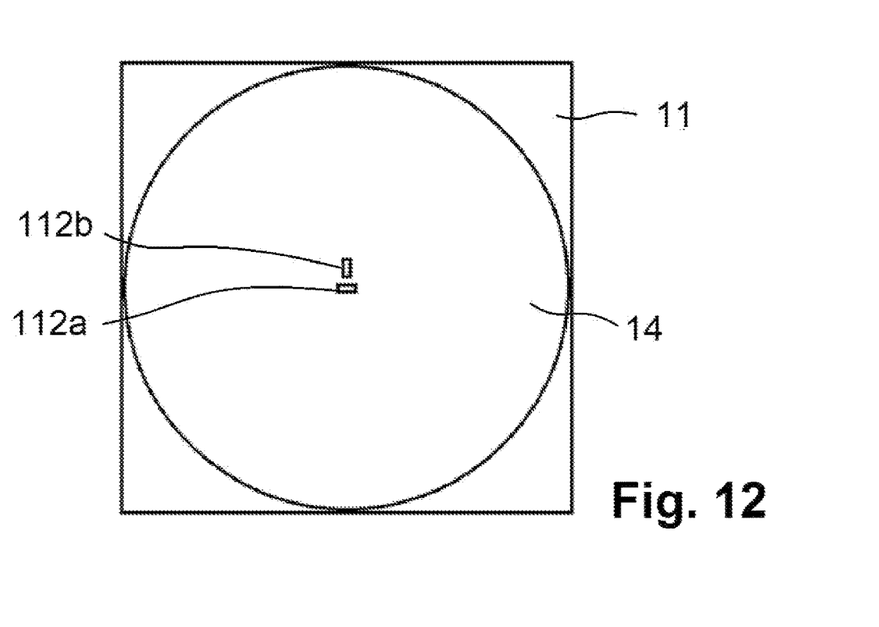
FIG. 12 a further embodiment with two channels.
Figure 13:
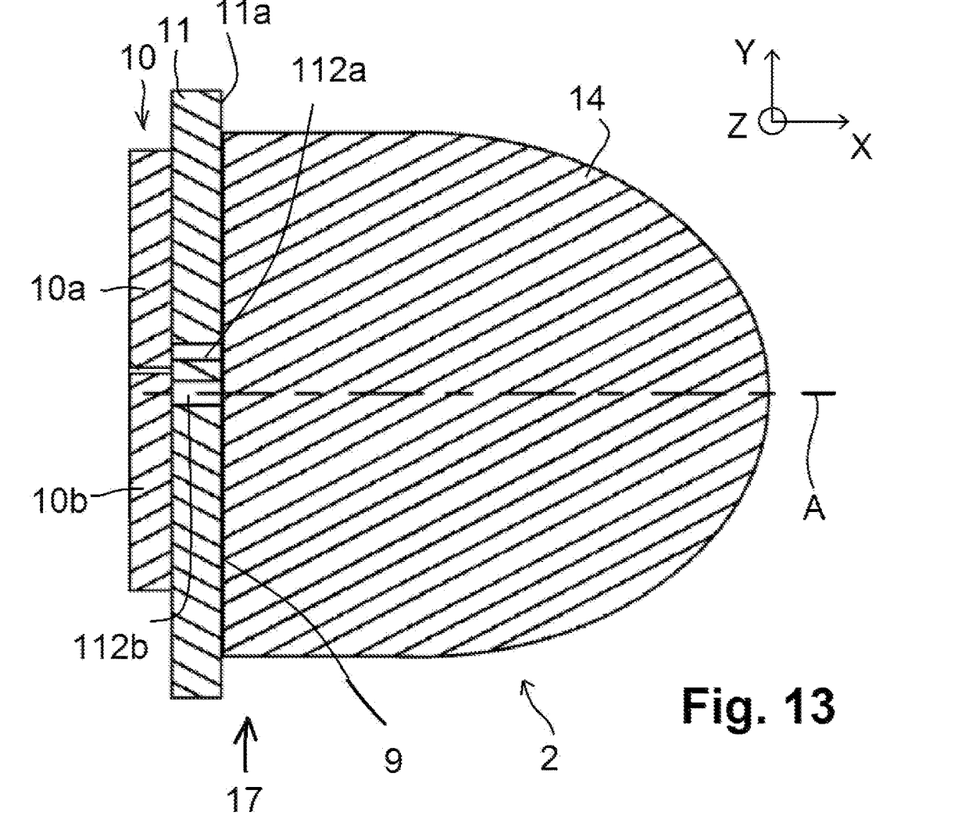
FIG. 13 a section through the lens from FIG. 12.

FIG. 12, 13 shows a further embodiment, wherein, in contrast to the embodiment of FIG. 2, 3, instead of a waveguide 12, two waveguide channels 112a, 112b are formed each supporting only one linear polarization due to their elongated rectangular shape. The two rectangular waveguide channels 112a, 112b are designed orthogonal in relation to one another in that they are formed in elongated shapes in directions orthogonal in relation to one another, e.g., z and y of the yz plane. Thus, the waveguide channels 112a, 112b are followed on the right side by the coupling-in points which together form the compensation formation 17 and a compensation area 9 or, respectively, are part of the compensation area 9. Hereby, a coupling-in is achieved in directions orthogonal in relation to one another.

In this embodiment, the THz transceiver 10 is formed by a transmitter 10a and a receiver 10b; however, in principle, the THz transceiver 10 may be formed on a FMCW radar chip.

Figure 14:
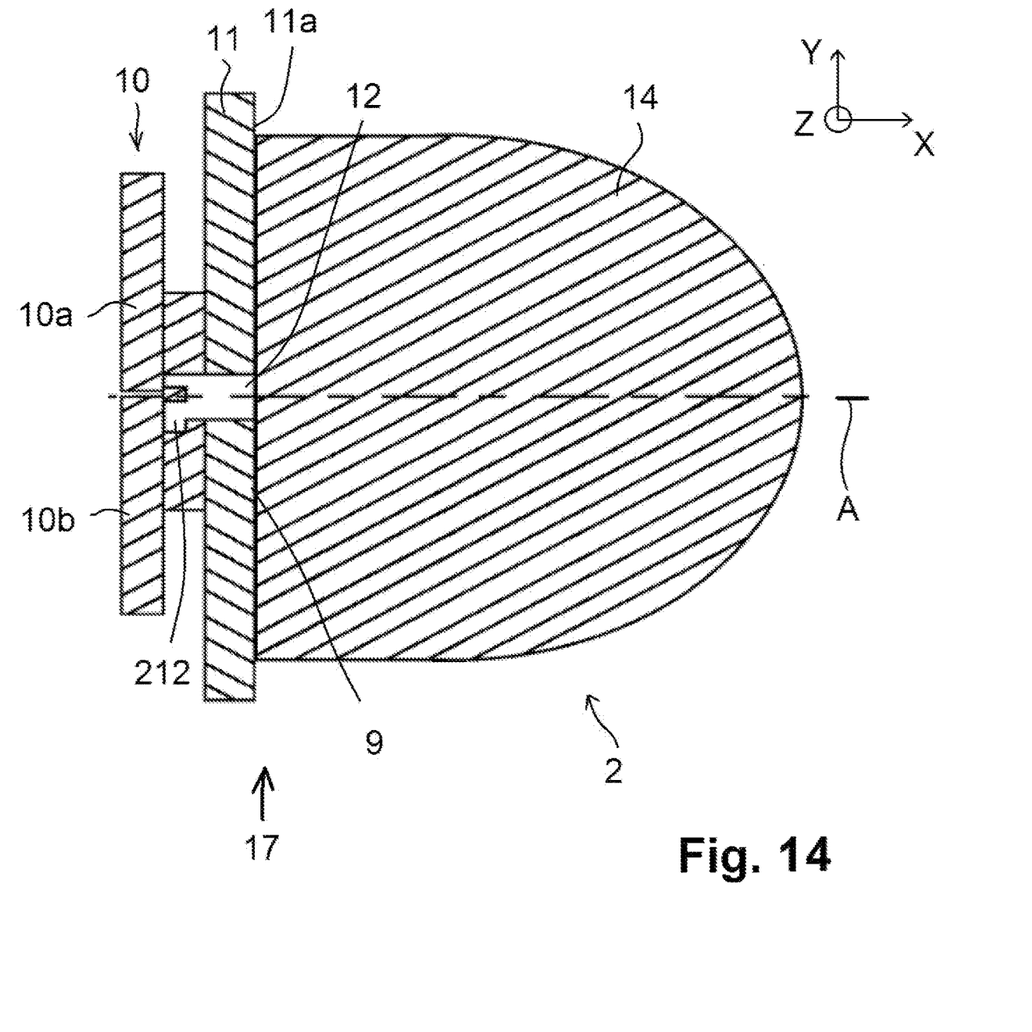
FIG. 14 a further embodiment with an OMT.

According to the embodiment of FIG. 14, an OMT 212, i.e., Orthomode transducer or, respectively, Orthomode coupler is provided as compensation formation 17 or part of the compensation formation 17, splitting up circular polarized waves, or, respectively, joins orthogonal polarized waves. Thus, in this case, preferably, the OMT 212 forms a square waveguide 12 in its right-hand area.

LIST OF REFERENCE NUMERALS

1 THz measuring device
2 THz sensor
3 adjustment device
4 controller device
5 measuring space
6 object to be measured, e.g., plastic pipe
7 central detection area
8 THz transmission beam
9 compensation area between lens 14 and support device 11
10 THz transceiver, e.g., sensor chip
10a THz-Transmitter or THz transceiver
10b THz-Receiver
11 support device, e.g., support plate, sensor holder
11a front side of plate, in particular, reflection plane
12 waveguide
14 lens
14a rear side of lend
15 reflected beam
15-2 doubly reflected beam
16 transpolarization structure
16a structure elevation
16b structure recess
b16 structure width
h16 profile height
$\alpha$16 structure angle
17 compensation formation
18 attenuating medium
19 gap
20 taper
21 connecting area
22 interference structure
22a, 22b, 22c structure recess of the interference structure 22

22d remaining area, structure recess=0 of the interference structure
24 coating
24a boundary surface of the coating 24 as transition from the coating 24 to the medium 25
25 medium, e.g., air, metal
112a, 112b elongate waveguide channels, in orthogonal orientation, for conducting exactly one polarization direction
212 Orthomode Transducer (OMT) structure
A optical axis of the THz sensor 2
B axis of symmetry of the THz measuring device 1, in particular, also pipe axis
c6 speed of light in the material of the object to be measured 6
c0 speed of light in vacuum, air
d1 distance of the boundary surface g1 to the THz sensor 2
d2 distance of the front face 11a to the boundary surface g1
$\varepsilon_r$ permittivity
$\varepsilon'_r$ real part, refractive index
$\varepsilon''_r$ attenuation, attenuation value
$\varepsilon_r$, Medium dielectricity of the media, where medium=6, 14, 18
g1, g2, g3, g4 boundary surfaces of the object to be measured 6
P0 wanted reflection peak
P1 double reflection peak
P2, P3, P4 higher multiple reflection peaks

The invention claimed is:

1. A THz sensor for measuring an object to be measured, the THz sensor comprising:
   a THz transceiver for emitting and receiving THz radiation,
   a lens for bundling the THz radiation emitted by the THz transceiver and emitting a THz transmission beam along the optical axis and for receiving a THz reflection beam,
   a support device, on which the lens and/or the THz transceiver is accommodated or fastened,
   wherein a THz radiation-influencing compensation formation for modifying and/or reducing incident THz radiation is provided in a compensation area between the lens and the support device, and
   wherein the THz sensor is configured to emit the THz transmission beam in polarized form and to detect merely a polarized reflected beam.

2. The THz sensor of claim 1, further comprising a waveguide provided between the lens and the THz transceiver and configured to conduct emitted or incident THz radiation, the compensation area being formed outside a central detection area formed in front of the waveguide and/or around the detection area.

3. The THz sensor of claim 2, wherein the compensation area is formed in a connecting area directly joining the detection area in a plane perpendicular or lateral to the optical axis.

4. The THz sensor of claim 1, wherein the compensation area includes one or more of the following elements or parts:
   a rear part of the lens,
   the support device, and
   a gap between the rear side of the lens and the support device.

5. The THz sensor of claim 1, wherein the compensation area is designed such that it influences THz radiation in one or more of the following manners:
   a) rotating a polarization plane,
   b) attenuating the THz radiation,
   c) deflecting or reflecting the incident reflected beam at least in part in a lateral or perpendicular direction in relation to the optical axis,
   d) forming a destructive interference,
   e) forming a destructive interference by means of a coating on the lens surface with optical transitions from the lens to the coating and from the coating to a further medium, the lens, the coating and the further medium having different refractive indexes and/or different permittivity.

6. The THz sensor of claim 1, wherein the THz transceiver is adapted for time-of-flight measurement and/or using frequency modulated radiation and/or for output and detection of pulsed radiation.

7. The THz sensor of claim 1, wherein the THz sensor is configured to emit the THz transmission beam in polarized form and to detect merely the polarized reflected beam by means of a polarized design of a waveguide and/or by means of a polarization filter.

8. The THz sensor of claim 1, wherein the compensation formation is adapted to reflect the incident reflected beam with a rotation of its polarization plane about an angle of rotation.

9. The THz sensor of claim 1, wherein compensation formation comprises a transpolarization (transverse polarization) structure extending in the plane perpendicular to the optical axis in a structure direction extending at a transpolarization angle in relation to the polarization direction, for rotating the polarization direction upon reflection in a direction perpendicular to the polarization direction.

10. The THz sensor of claim 9, wherein the transpolarization structure exhibits one or more of the following characteristics:
    profilings extending in the structure direction,
    a structure width that is smaller than a relevant wavelength of the THz radiation,
    a structure height which is one quarter of the relevant wavelength.

11. The THz sensor of claim 1, wherein, in the compensation area, which is located behind the lens and/or inside of the lens, two separate waveguide channels are formed which are adapted to pass, owing to their shapes, each only exactly one linear polarization direction, wherein these two polarization directions are orthogonal in relation to one another.

12. The THz sensor of claim 1, wherein an Orthomode coupler is provided in the compensation area which splits the THz transmission beam in two opposingly circularly polarized waves and/or joins orthogonally polarized waves.

13. The THz sensor of claim 1, wherein an attenuating medium is provided in a gap between the rear side of the lens and a metal front side of a support plate, wherein the attenuating medium attenuating THz radiation in a wavelength range, the wavelength range being located around an average wavelength.

14. The THz sensor of claim 13, wherein the attenuating medium exhibits a complex relative permittivity $\varepsilon_r$ which is described by a real part $\varepsilon'_r$ and an imaginary part $\varepsilon''_r$ as $\varepsilon_r = \varepsilon'_r + i\varepsilon''_r$ (equation 1), where the imaginary part $\varepsilon''_r$ describes an attenuation value of the attenuating medium, and a refractive index of the attenuating medium corresponds to a refractive index of the lens, so as to avoid reflections between the lens rear side and the attenuating medium.

15. The THz sensor of claim 4, wherein a front face of the support device comprises a taper in the compensation area, to deflect the reflection beam at least in part in a direction perpendicular to the optical axis, the reflection beam incoming along the optical axis into the gap.

16. The THz sensor of claim 1, wherein an interference structure is formed in a reflection plane, to reflect the reflection beam incoming into a gap while creating a destructive interference, including a plurality of structure recesses for creating reflections of different path lengths which equal suitable values of a relevant or several relevant wavelengths of a wavelength range of the emitted THz radiation.

17. The THz sensor of claim 1, wherein the lens has an arched front face and a planar and/or structured lens rear side by means of which the lens is directly or indirectly attached to the support device.

18. A THz measuring device for measuring an object to be measured, the THz measuring device comprising
- at least one THz sensor (2) according to claim 1 for emitting a THz transmission beam and receiving a THz reflection beam,
- a controller device adapted to receive a measuring signal of the THz transceiver and to determine distances and/or layer thicknesses of an object to be measured, and
- a measuring space for accommodating the object to be measured.

19. The THz measuring device of claim 18, further comprising a housing surrounding a measuring space for accommodating the object to be measured, the THz sensor being provided on the housing.

* * * * *